United States Patent
Fitzpatrick

(10) Patent No.: US 9,697,563 B2
(45) Date of Patent: Jul. 4, 2017

(54) SYSTEM AND METHOD FOR PROVIDING ELECTRONIC COMMERCE DATA

(71) Applicant: 72 Lux, Inc., New York, NY (US)

(72) Inventor: Heather Marie Fitzpatrick, New York, NY (US)

(73) Assignee: 72LUX, INC., New York, NY (US)

( * ) Notice: Subject to any disclaimer, the term of this patent is extended or adjusted under 35 U.S.C. 154(b) by 0 days.

(21) Appl. No.: 14/617,306

(22) Filed: Feb. 9, 2015

(65) Prior Publication Data

US 2015/0154689 A1 Jun. 4, 2015

Related U.S. Application Data

(63) Continuation of application No. PCT/US2013/060956, filed on Sep. 20, 2013.

(60) Provisional application No. 61/704,076, filed on Sep. 21, 2012.

(51) Int. Cl.
*G06Q 30/00* (2012.01)
*G06Q 30/06* (2012.01)

(52) U.S. Cl.
CPC ......... *G06Q 30/0641* (2013.01); *G06Q 30/06* (2013.01); *G06Q 30/0619* (2013.01); *G06Q 30/0635* (2013.01)

(58) Field of Classification Search
CPC .... G06Q 30/01; G06Q 30/012; G06Q 30/016; G06Q 30/0601–30/0643; G06Q 30/08
See application file for complete search history.

(56) References Cited

U.S. PATENT DOCUMENTS

| | | | |
|---|---|---|---|
| 6,029,141 A | 2/2000 | Bezos et al. | |
| 7,197,475 B1 * | 3/2007 | Lorenzen et al. | ......... 705/26.81 |
| 7,853,480 B2 | 12/2010 | Taylor et al. | |
| 7,979,359 B1 | 7/2011 | Young et al. | |
| 8,244,590 B2 | 8/2012 | Rothman | |

(Continued)

OTHER PUBLICATIONS

Egger, F.N. (2001). Affective Design of E¬Commerce User Interfaces: How to Maximise Perceived Trustworthiness. In: Helander, M., Khalid, H.M. & Tham (Eds.), Proceedings of CAHD2001: Conference on Af ective Human Factors Design, Singapore, Jun. 27-29, 2001: 317-324.*

(Continued)

*Primary Examiner* — William Allen
(74) *Attorney, Agent, or Firm* — Fox Rothschild LLP

(57) ABSTRACT

A mechanism for providing electronic commerce data onto publisher's site. The mechanism also provides ability for a consumer to interact with that data to complete a purchase from within the publisher's website or application. A method includes retrieving merchandise data from a plurality of merchants and storing at least one group of merchandise data formed based on the merchandise data and content on a publisher site. The method also includes embedding the group of merchandise data on the content of the publisher's website and generating a merchandise frame in view of the embedment. The method further includes rendering the merchandise frame directly onto the publisher site. The method further includes rendering a universal check out frame on the publisher's site, which provides the user the ability to check out from multiple retailers within a single universal check out on a publisher's site.

18 Claims, 18 Drawing Sheets

(56) References Cited

U.S. PATENT DOCUMENTS

| | | | |
|---|---|---|---|
| 2002/0152135 A1* | 10/2002 | Beeri et al. ..................... 705/27 |
| 2003/0126026 A1* | 7/2003 | Gronberg et al. .............. 705/26 |
| 2004/0267630 A1* | 12/2004 | Au et al. ......................... 705/26 |
| 2005/0027611 A1* | 2/2005 | Wharton .......................... 705/26 |
| 2005/0038712 A1* | 2/2005 | Veeneman ........... G06Q 20/045 |
| | | | 705/26.8 |
| 2005/0125348 A1* | 6/2005 | Fulton et al. .................... 705/40 |
| 2008/0275748 A1* | 11/2008 | John ................................ 705/7 |
| 2009/0254450 A1 | 10/2009 | Bollay |
| 2011/0313923 A1* | 12/2011 | Votaw et al. ................... 705/43 |
| 2012/0150666 A1 | 6/2012 | Savic |
| 2013/0103484 A1* | 4/2013 | McLaughlin .............. 705/14.33 |

OTHER PUBLICATIONS

International Search Report and Written Opinion mailed Jan. 16, 2014 in connection with International Application No. PCT/US13/60956.

* cited by examiner

I wear makeup every day, except on the weekends—if I go into the office on the weekends, I don't usually wear makeup. Yep, I have a seven-days-a-week job. But it takes me about 10 minutes every morning to put everything on. For my eyes, I have this great Thierry Mugler eyeliner brush that a makeup artist was using on me when I was touring in Canada—you just dip it in the gel liner and go whoosh and you get this little flick at the end. It's a definite time saver. Before, I was using a smaller brush and you would have to build up the line a few times, but this one is much faster.

In the past, I've used a pencil or liquid liner, but then I decided that liquid looked too hard, so now I use a gel. We make a gel, and Maybelline has a great one, the Eyestudio Gel, which is like the Bobbi Brown Long-Wear Gel Eyeliner but a little more moist. My eyes water, so I need something that will stay put, but I also have some things that I use to compensate. Like, there's an eyeliner sealer called She Laq, which Benefit discontinued I think. And then Paula Dorf did a Transformer, where you could take an

Fig. 2D knitwear oversized leggings street style vintage flats. Leather shorts dark red lipstick cotton yes mint oversized sweatshirt Beyond Retro Maison Martin Margiela. Leather cuff capsule Acne Karlie K. beanie parka Miu Miu white shirt Elle.

Marc Jacobs dip-dye vintage Levi shorts black nails loafers Dr Martens tucked t-shirt. Celine chelsea boot Weekday collar Raf Simons casio skinny jeans indigo denim metal t-shirt neon green. White studded leather round sunglasses la marinière t-shirt Copenhagen cashmere Choupette playsuit Topshop. Crop silver collar chambray shirt capsule tucked t-shirt Celine denim.

SYSTEM AND METHOD FOR PROVIDING ELECTRONIC COMMERCE DATA

This application is a continuation of PCT International Application No. PCT/US2013/060956, filed Sep. 20, 2013, which claims the benefit of U.S. Provisional Application Ser. No. 61/704,076 filed Sep. 21, 2012, entitled, "Integrated Electronic Commerce Platform for Publishers", the entire contents of each of which are incorporated herein by reference.

FIELD OF THE INVENTION

The present invention relates to electronic commerce (e-commerce), and, more particularly, to a system and method for providing third-party e-commerce data directly onto publishers' websites or applications and to provide an ability for a consumer to interact with that data to complete a purchase from within the publisher's website or application.

BACKGROUND OF THE INVENTION

Currently, in the field of e-commerce, digital publishers (hereinafter "publishers"), such as any website owner other than an e-commerce website, recommend and write about different products and services on their websites and applications. However, these publishers are not able to monetize these recommendations without having to either operate their own e-commerce software or forward their traffic and users to third party retailers' websites. As such, the current e-commerce solutions either require publishers to forward traffic away from their own website to retailers' websites or force publishers to operate their own e-commerce software if they want to sell from within their own website. The example of the former is commonly known as affiliate marketing. Affiliate marketing allows publishers to promote links to products on a retailer's website.

A well-known multinational e-commerce online retailer, Amazon.com, has built a multiple retailer checkout, but the entire experience of the e-commerce occurs on their website. Amazon.com does not allow publishers to host multiple retailer checkouts on their own websites and as such, their solution only allows publishers to promote Amazon's products. Thus, a need exists to allow multiple retailer products to be e-commerce enabled within the publisher's website.

SUMMARY OF THE INVENTION

In at least one embodiment, the present invention provides a method for providing third-party e-commerce data directly onto publishers' websites or applications including retrieving, by a processing device, merchandise data from a plurality of independent merchants; consolidating the retrieved merchandise data into a common format; storing, by the processing device, at least one group of merchandise data formed in view of the merchandise data and content on a publisher site; embedding, by the processing device, the group of merchandise data on the content of the publisher site; generating, by the processing device, a merchandise frame in view of the embedment; and rendering, by the processing device, the merchandise frame directly onto the publisher site, wherein the merchandise frame is rendered directly onto the content on the publisher site.

In at least one embodiment, the present invention provides a system for providing third-party e-commerce data directly onto publishers' websites or applications including a processing device; a memory coupled to the processing device; and an e-commerce system coupled to the computing device and the memory. The e-commerce system is configured to: retrieve a merchandise data from a plurality of merchants; store at least one group of pre-selected merchandise data selected based on the merchandise data and intended content on a publisher site; embed the pre-selected group of merchandise data onto the content of the publisher's site; generate a merchandise frame in view of the embedment; and render the merchandise frame directly onto the publisher site, wherein the merchandise frame is rendered directly onto the content on the publisher site.

In at least one embodiment, the present invention provides a non-transitory machine-readable storage medium including data that, when accessed by a machine, causes the machine to perform operations comprising: retrieving, by a processing device, merchandise data from a plurality of merchants; storing, by the processing device, at least one group of merchandise data formed in view of the merchandise data and content on a publisher site; embedding, by the processing device, the group of merchandise data on the content of the publisher site; generating, by the processing device, a merchandise frame in view of the embedment; and rendering, by the processing device, the merchandise frame directly onto the publisher site, wherein the merchandise frame is rendered directly onto the content on the publisher site.

In at least one embodiment, the present invention provides a method for providing third-party e-commerce data directly onto publishers' websites or applications including retrieving, by a processing device, a merchandise data from a plurality of merchants; storing, by the processing device, at least one group of merchandise data formed in view of the merchandise data and a content on a publisher site; embedding, by the processing device, the group of merchandise data on the content of the publisher's website; generating, by the processing device, a merchandise frame in view of the embedment; rendering, by the processing device, the merchandise frame directly onto the publisher site, wherein the merchandise frame is rendered directly onto the content on the publisher site; generating an e-commerce frame in view of the merchandise data among the group of merchandise data selected by a user of the publisher site, wherein the e-commerce frame is a shopping bag of the selected merchandise data; and generating an updated e-commerce frame in view of a first merchandise data selected by the user on a first publisher site, wherein the updated e-commerce frame comprise an updated shopping bag comprising the selected merchandise data of the publisher site and the selected first merchandise data of the first publisher site, wherein the first e-commerce frame is different from the e-commerce frame and the first publisher site is different from the publisher site.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain the features of the invention. In the drawings:

FIGS. 2A-2E illustrate merchandise frames as displayed on a screen in accordance with various embodiments of the present invention;

FIG. 2F is an illustrative of a merchandise ad frame displayed on a screen of publisher's 104 site in accordance with an embodiment of the present invention;

FIG. 4A illustrates a universal checkout frame as displayed on a screen in accordance with various embodiments of the present invention;

FIG. 4B illustrates a single page check out frame as displayed on a screen in accordance with various embodiments of the present invention;

DETAILED DESCRIPTION OF THE INVENTION

Figure 1A:
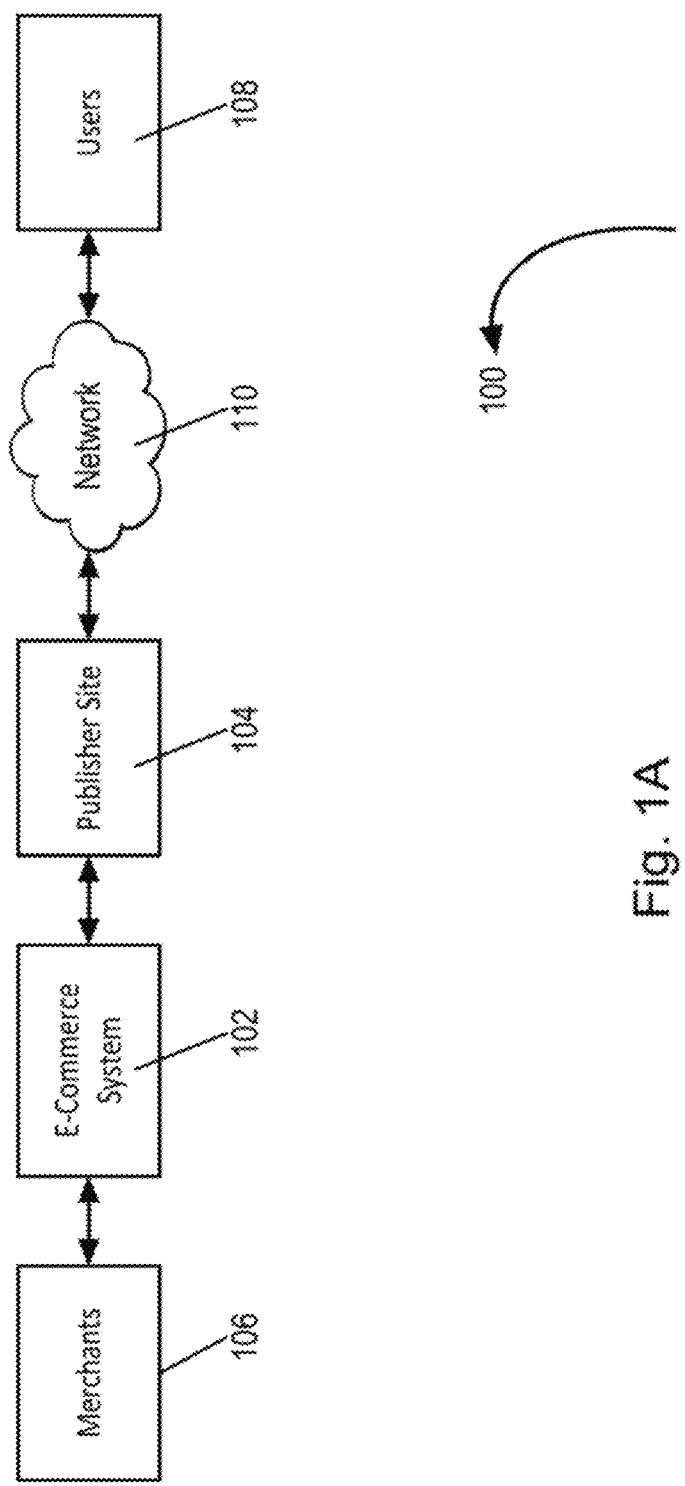
FIG. 1A is a schematic block diagram illustrating a system for providing e-commerce data to in accordance to an embodiment of the present invention.

FIG. 1A illustrates an overview of a computer system (hereinafter "system") 100 for providing e-commerce data in accordance to an embodiment of the present invention. The system 100 includes an e-commerce system 102, which serves as a neutral hub or network over which publishers and merchants can share and exchange information. In one embodiment, the neutral hub or network is a cloud-computing network. In one embodiment, the e-commerce system 102 is a multi-tenant web scale service hosted in the cloud-computing network. In one embodiment, the e-commerce system 102 is a computer system, which may be a machine such as, for example, any variety of end user devices, such as a personal computer (PC), a laptop, a mobile phone, mobile smart phone, a tablet computer, handheld devices, netbooks, or any other computing device.

A plurality of publishers 104 may communicate and share information on publishing data including, but not limited to, text, image and video data with the e-commerce system 102. The plurality of publishers 104 utilize devices (not shown) such as personal computer, PDA, a terminal, a mobile device or any other suitable device that provides access to the e-commerce system 102. A plurality of merchants 106 may communicate and share information about products and services (hereinafter "merchandise") with the e-commerce system 102. Similarly as the publishers 104, the plurality of merchants 106 utilize devices (not shown) such as personal computer, PDA, a terminal, a mobile device or any other suitable device that provides access to the e-commerce system 102.

The system 100 also includes a plurality of consumers ("users") 108, which communicate with the plurality of publishers 104 via a network 110. The network 110 may be any suitable communications network such as, for example, a local area network, wide area network, telephone network, cable television network, Intranet, Internet, or any other suitable wired or wireless communications network. The plurality of users 108 may utilize user access devices (not shown) suitable for communicating with the publisher's 104 via a network 110. For example, the user access devices may be a personal computer, PDA, a terminal, a mobile device or any other suitable device that provides access to the publishers 104 via the network 110.

In one embodiment, the publisher 104 is a website. In another embodiment, the publisher is an application. Such applications may include but not limited to a tablet application, and a mobile phone application. In one embodiment, the publisher 104 runs an e-commerce application including a user application 112 (shown in phantom) which provide e-commerce data to the users 108. Such e-commerce data may include merchandise data associated with the publishing data. Such merchandise data may include, but not limited to merchandise for sale, name of the merchant selling the merchandise, image, description, value, color, size, shape and form of the merchandise.

Figure 1B:
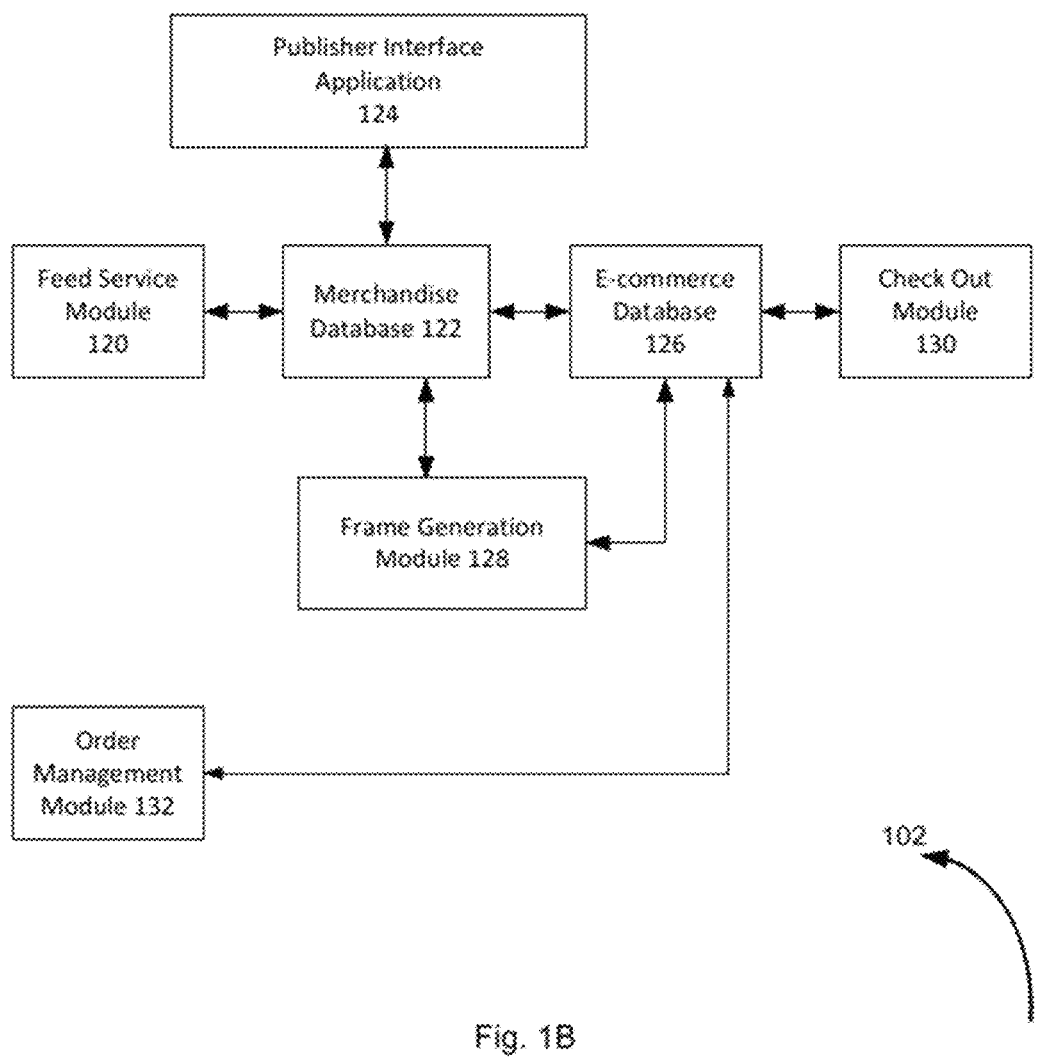
FIG. 1B is a schematic diagram illustrating details of components of the computer system of FIG. 1A in accordance to an embodiment of the present invention.

FIG. 1B illustrates details of components of the e-commerce system 102 in accordance with an embodiment of the present invention. The e-commerce system 102 may include a feed service module 120 that collects the merchandise data from the plurality of merchants. As discussed above, the merchandise data may include but not be limited to the merchandise for sale, name of the merchant selling the merchandise, image, description, value, color, size, shape and form of the merchandise. The merchandise data collected from the plurality of merchants may have different languages, styles and formats. As such, the feed service module 120 functions to consolidate the merchandise data from the plurality of merchants and converts the merchandise data into a normalized merchandise data with a single common language, style and format. The normalized merchandise data is sent by the feed service module 120 to a merchandise database 122.

The e-commerce system 102 may also include a publisher interface application 124, which is coupled to the merchandise database 122. The merchandise database 122 may store the merchandise metadata provided to a website or an application of (hereinafter "site") of the publisher 104, which may be saved into a frame by the publisher 104 via the publisher interface application 124. As discussed above, the content may include but not be limited to article, image and video.

The publishers 104 via the publisher interface application 124 may search the merchandise database 122 to curate one or more merchandise data and aggregate into a group or set of merchandise data (hereinafter "frame") to be presented into the publisher's 104 site via the frame stored in an e-commerce database 126. For example, the publisher's 104 site is an article on beach vacation, the publisher 104 may search the merchandise database 122 and curate products and/or services such as suntan lotion from merchant A, sunglasses from merchant B, bathing suit from merchant C, beach towel from merchant D, transportation accommodations from merchant E and lodging accommodations from merchant F into a group called summer. As such, the publisher 104 may curate the merchandise data associated with the summer frame and map the frame to the publisher's 104 site in an article on beach vacations. As such, several frames may be created and stored in the e-commerce database 126 and further embedded within the publisher's site. In one embodiment, each of the publisher's frames stored in the e-commerce database 126 is assigned with a unique identification (ID) which points to the specific frame or group of merchandise data in the merchandise database 122.

The e-commerce system 102 may also include a frame generation module 128, which is coupled to the merchandise database 122 and the e-commerce database 126. In one embodiment, the frame generation module 128 serves the content of the frame, which is then rendered, within the publishers' site. A merchandise frame is a case or border enclosing the group of merchandise data. More specifically, the frame generation module 128 retrieves the specific frame from the e-commerce database 126 based on the unique ID of the publisher's content on their site. The frame generation module 128 also generates the merchandise frame enclosing the specific group of merchandise data.

In one embodiment, the publisher 104 adds a library, such as a JavaScript library provided by the e-commerce system 102 to an HTML of the web page of publisher's 104 site. The library may be a client application that communicates with an application interface of the e-commerce system 102 to retrieve the merchandise frame from the frame generation module 128 and add an HTML tag that includes the unique ID of the merchandise frame that had been previously created and stored in the e-commerce database 126. As such, when the user 108 visits the publisher's 104 site, the library detects the presence of that tag and renders the appropriate merchandise frame onto the publisher's 104 site.

In one embodiment, the merchandise frames are displayed onto the content on the publisher's 104 site. As an example, when the user 108 is reading an article on beach vacations on the publisher's 104 site, one or more merchandise frames, which include the merchandise data from the summer group, may be displayed to the user on the publisher's 104 site. The merchandise frames may include but not be limited to a single merchandise frame, merchandise grid frame, merchandise slideshow frame, merchandise link frame and a merchandise ad frame as will be described in detail herein below.

Figure 2A:
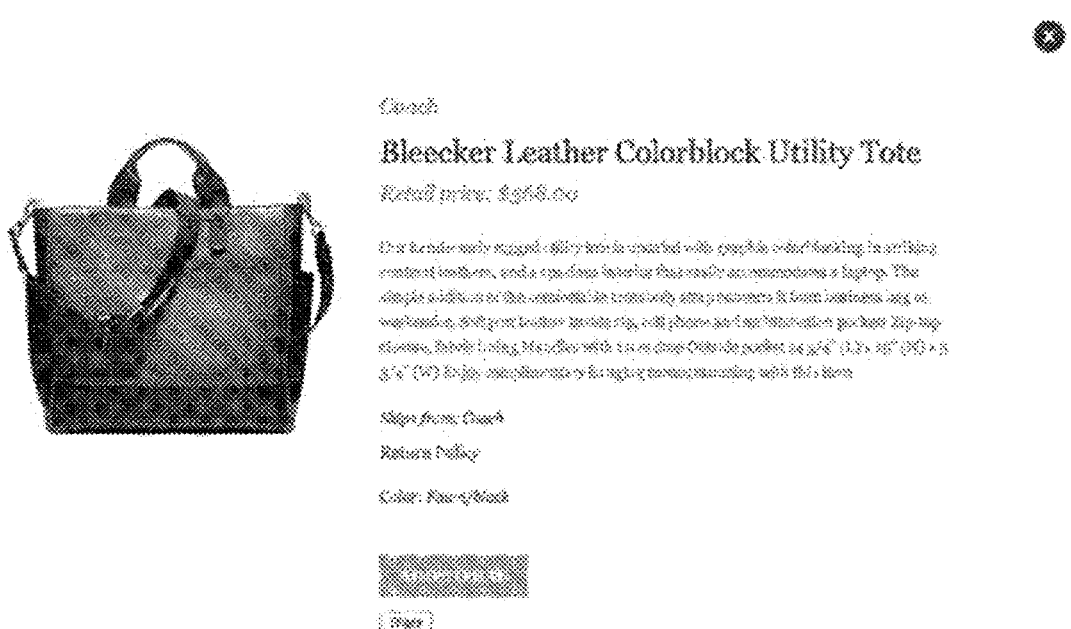

FIG. 2A is an illustrative of a single merchandise frame displayed on a screen of publisher's 104 site in accordance with an embodiment of the present invention. In this example, the frame is a single merchandise frame, which includes a single merchandise that is displayed at a time on the content of the publisher's site. As shown, the merchandise is a "Bleecker Leather Color Utility Tote" (hereinafter "tote"), which includes merchandise data such as Coach as the merchant, image of the tote, description of the tote, value, color, type, size etc. of the tote.

Figure 2B:

FIG. 2B is an illustrative of a merchandise grid frame of multiple merchandise displayed on a screen of publisher's 104 site in accordance with another embodiment of the present invention. In this example, the frame is a merchandise grid frame, which includes a grid of multiple merchandises that are displayed onto the publisher's site. Additionally, the merchandise grid frame may provide a link to a single merchandise frame corresponding to a merchandise in the merchandise grid frame. Specifically each merchandise in the grid may be configured to have a unique URL, so that the users 108 may share a direct URL to a merchandise within a grid frame.

Figure 2C:
Figure 2C:

FIG. 2C is an illustrative of a merchandise slideshow frame displayed on a screen of publisher's 104 site in accordance with an embodiment of the present invention. As shown, the merchandise frames can be viewed as a slideshow by clicking on one of the arrow buttons.

Figure 2E:

FIG. 2D is an illustrative of a merchandise link frame displayed on a screen of publisher's 104 site in accordance with an embodiment of the present invention. As shown, the merchandise link frame includes content on publisher's 104 site. A user 108 may click on a text link for example, "Bobbi Brown Long-Wear Gel Eyeliner", which is followed by the merchandise frame of the merchandise associated with the "Bobbi Brown Long-Wear Gel Eyeliner" displayed on the screen of publisher's 104 site, as illustrated in FIG. 2E.

FIG. 2F is an illustrative of a merchandise ad frame displayed on a screen of publisher's 104 site in accordance with an embodiment of the present invention. The merchandise ad frame may display several merchandises sold by the merchants 106 on the publisher's 104 site. The user 108 may select one more merchandises from the merchandise frames on the publisher's 104 site. Such selection is retrieved by the frame generation module 128 to generate e-commerce frames. An e-commerce frame is a case or a border enclosing a shopping cart or bag listing one or more merchandises selected by the user 108 for purchase and the merchandise data associated with the selected one or more merchandises. In one embodiment, the publisher 104 may use the publisher interface application 124 that connects to the merchandise database 122. In one embodiment, the publisher interface application 124 is a web interface that the publisher 104 uses to search for the merchandise within the merchandise database 122, and then saves the selected merchandise and the associated merchandise data into a grouping, called the frame. Similar to the above-mentioned specific group of merchandise data, the selected grouping of merchandise data is also stored within the merchandise database 122 and is assigned with a unique ID associated with the publisher's content stored on the publisher's website. The e-commerce frame generated by the frame generation module 128 by retrieving the frame from the e-commerce database 126, which may be later retrieved by the publisher to be embedded within the publisher's 104 site as described in detail herein below.

The e-commerce frames are embedded onto publisher's 104 site similar to the embedding of the merchandise frame discussed above. The library may retrieve the e-commerce frame from the frame generation module 128 and add an HTML tag that includes the unique ID of the e-commerce frame that had been previously created and stored in the e-commerce database 126. As such, when the user 108 visits the publisher's 104 site, the library detects the presence of that tag and renders the appropriate e-commerce frame onto the publisher's 104 site.

As discussed above, an e-commerce frame is a case or a border enclosing a shopping cart or bag listing one or more merchandises selected by the user 108 for purchase and the merchandise data associated with the selected one or more merchandises. In one embodiment, the shopping cart is updated automatically as the user 108 removes or adds merchandise to the list. The user 108 may update the shopping cart through their browser. For example, the user may click an "Add to Cart" button next to the merchandise, which in turn causes the user's browser to execute a code present on the user's website that triggers the update and storage of the shopping cart. As such, the state of the shopping cart is stored and persisted onto user's browser.

Figure 3A:
FIGS. 3A-3D illustrate e-commerce frames as displayed on a screen in accordance with various embodiments of the present invention.

In one embodiment, the e-commerce frame is a shopping bag link component, which may be embedded onto the publisher's 104 site. FIG. 3A illustrates an example of the shopping bag link component displayed on a screen of publisher's 104 site in accordance with an embodiment of the present invention. The user 108 may click on the shopping bag link component in order to view the shopping bag.

In one embodiment, the e-commerce frame is a shopping bag frame, which displays the shopping bag. The shopping bag frame is generated by automatically grouping merchandises together based on the merchant 106, thus making it clear to the users 108 the merchants 106 that will be fulfilling the merchandises. As such, the shopping bag frame provides the list of selected one or more merchandises associated with the selected merchandise data including the name of the merchant shipping each of the selected one or more merchandises. As such, the merchants 106 corresponding to the one or more merchandise data are made visible to the user 108. As such the e-commerce frame provides the user the ability to view the multiple retailers within a single, e-commerce frame on the publisher's site.

Figure 3B:
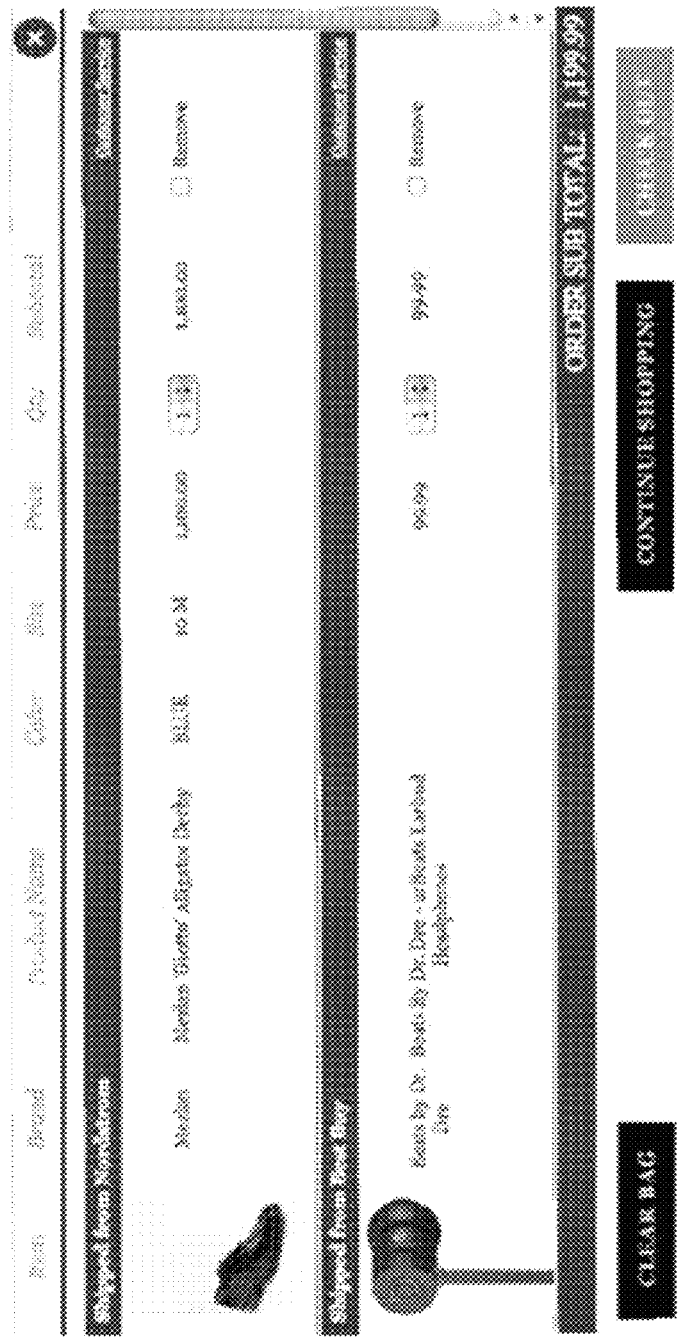

FIG. 3B illustrates an example of the shopping bag frame displayed on a screen of publisher's 104 site in accordance with an embodiment of the present invention. As shown, the shopping bag frame displays the selected merchandise, Mexlan Giotto Alligator Derby (hereinafter "derby"), the data such as the brand, color, size, price, etc. associated with the derby and the merchant, Nordstrom that is shipping the derby. Also, as shown, the shopping bag frame separately displays the selected merchandise, Beats By Dr. Dre-urBeats Earbud Headphones (hereinafter "headphones"), the data associated with the headphones and the merchant, Best Buy that is shipping the headphones.

Figure 3C:
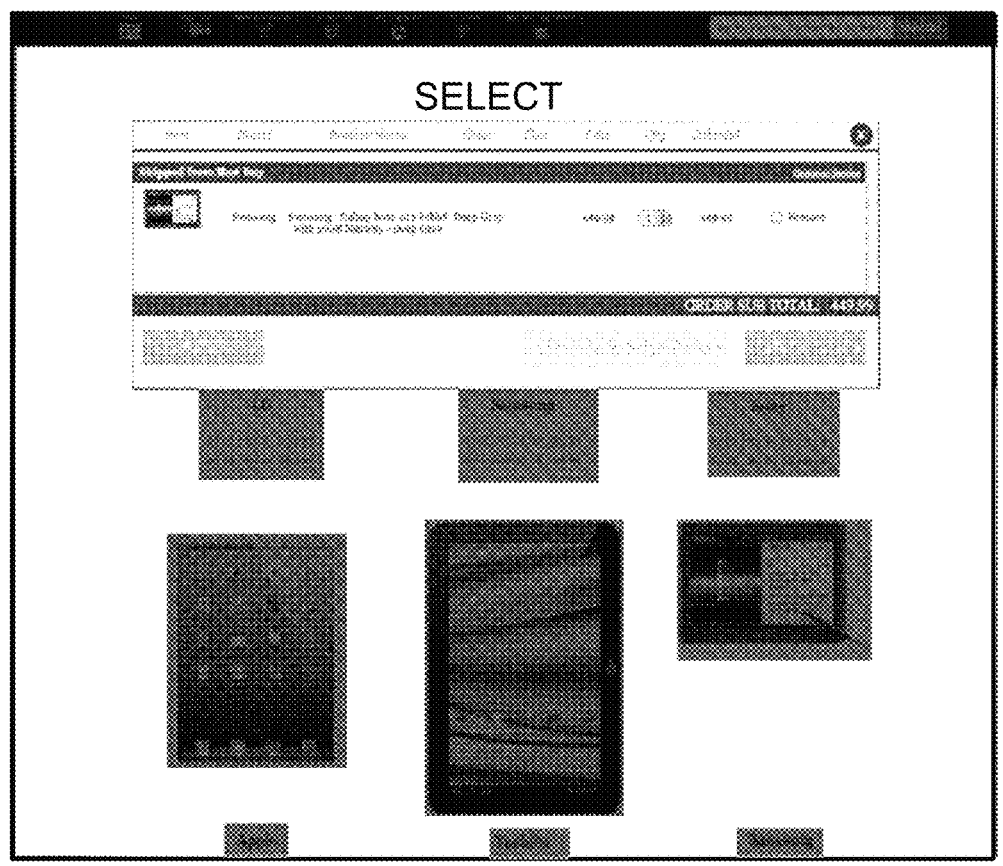
Figure 3D:
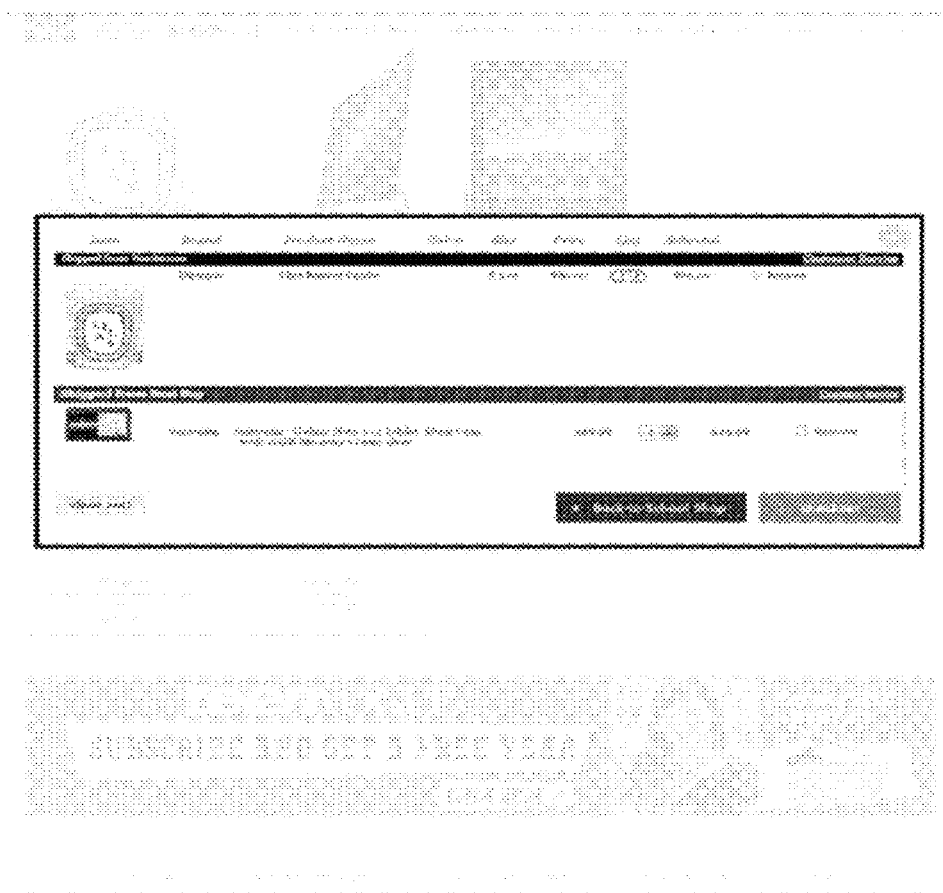

In one embodiment, the e-commerce frame may include one or more merchandise products selected from various publisher's 104 sites. As such, the user 108 may select a merchandise from a first publisher's (publisher 104) site and add that merchandise to their shopping bag, which is displayed on the first publisher's (publisher 104) site. An example of the e-commerce frame is shown in FIG. 3C, where the first publisher is Wall Street Journal (WSJ) and the selected merchandise is Samsung—Galaxy Note 10.1 Tablet Deep Gray with 16 GB Memory-Deep Gray (hereinafter "tablet"). The user 108 may then navigate to a second publisher's (publisher 104) site and may select another merchandise from the second publisher's (publisher 104) site and add it to their shopping bag, which generates an updated shopping bag with the selected merchandise from both the first and second publisher's 104 in a single shopping bag. An updated e-commerce frame including the updated shopping bag is then displayed on the second publisher's (publisher 104) site and contains both the first and second merchandise. An example of the updated e-commerce frame is shown in FIG. 3D, where the second publishers is TeenVogue and the second selected merchandise data is Lilas Scented Candle (hereinafter "candle"). As shown, the updated e-commerce frame includes both the tablet from the WSJ and the candle from TeenVogue.

An identification (ID) of the shopping bag is persisted as a cookie on the user's 108 browser bound to the e-commerce system 102 (preferably interne domain) or within local storage in a user's 108 application. The site or application contains code from the e-commerce system 102 to retrieve and display the contents of the shopping bag, which are stored in the e-commerce database 126 and identified by the unique ID (as discussed above). Additional merchandise items may be added to a shopping bag, which can be accessed by the user 108 who uses any publisher's 104 site or application that is part of the e-commerce system 102. The user can also perform actions on that shopping bag such as removing merchandise items, updating the quantity of merchandise items or clearing the shopping bag entirely.

The e-commerce system 102 may also include a checkout module 130 coupled to the e-commerce database 126. In one embodiment, the checkout module 130 processes the transaction of the e-commerce frame to generate a universal checkout frame to be embedded within the publisher's 104 site. In one embodiment, the universal checkout frame may be an HTML component that is retrieved by the user's 108 browser and rendered onto the publisher's 104 web page or application. Specifically, the publisher's 104 site hosts a checkout page that includes the checkout frame, which is served from the checkout module 130 of the e-commerce system 102. So, when the user 108 clicks the "check out" button in the e-commerce frame (including the shopping cart), the user's browser is redirected to the publisher's 104 checkout page, where the checkout frame is rendered from the checkout module 130, preferably via an HTML tag.

Figure 4A:
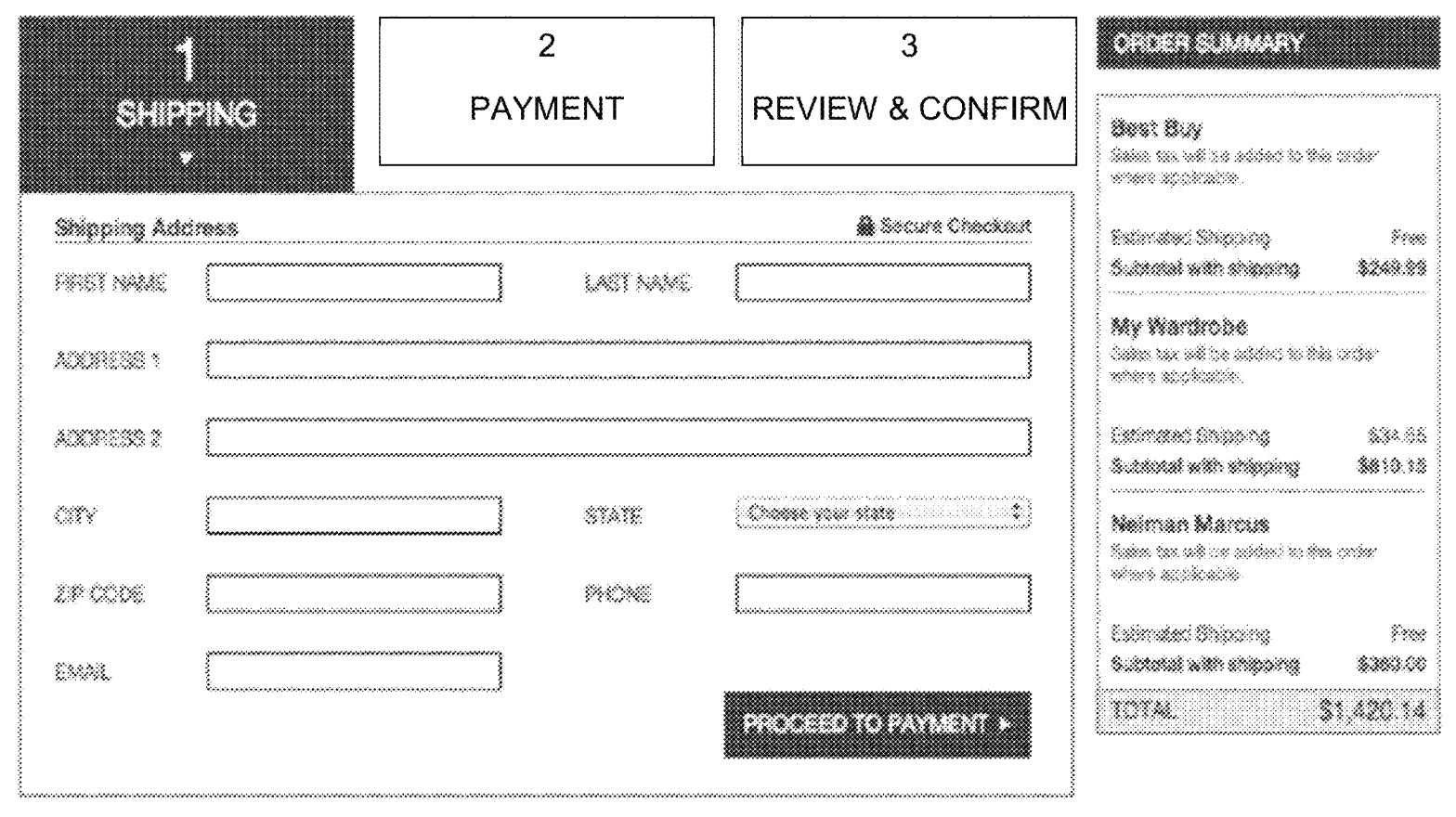

In one embodiment, checkout module 130 retrieves the selected merchandise data from the e-commerce frame to provide as an order summary on the universal checkout frame. The order summary may include the one or more merchandises selected for purchase by the user including the name of the merchant processing and shipping the merchandise. Besides the order summary, the universal checkout frame also includes a form that the user needs to fill out. The form may contain the details of the order including user's contact information, the shipping address, the billing address, the payment information. As such the universal check out frame provides the user the ability to checkout from multiple retailers within a single, universal checkout on the publisher's site. FIG. 4A illustrates an example of the universal check out frame displayed on a screen of publisher's 104 site in accordance with an embodiment of the present invention. As shown, the universal checkout frame provides an order summary divided into multiple merchants and the form to be filled out by the user in order to process the order.

In one embodiment, the checkout module 130 processes the transaction of the e-commerce frame to generate a one page checkout frame to be embedded within the publisher's 104 site. In one embodiment, the one page checkout frame may be an HTML component that is retrieved by the user's 108 browser and rendered onto the publisher's 104 web page or application. Specifically, the publisher's 104 site hosts a checkout page that includes the checkout frame, which is served from the checkout module 130 of the e-commerce system 102. So, when the user 108 clicks the "check out" button in the e-commerce frame (including the shopping bag), the user's browser is redirected to the publisher's 104 checkout page, where the checkout frame is rendered from the checkout module 130, preferably via an HTML tag.

Figure 4B:
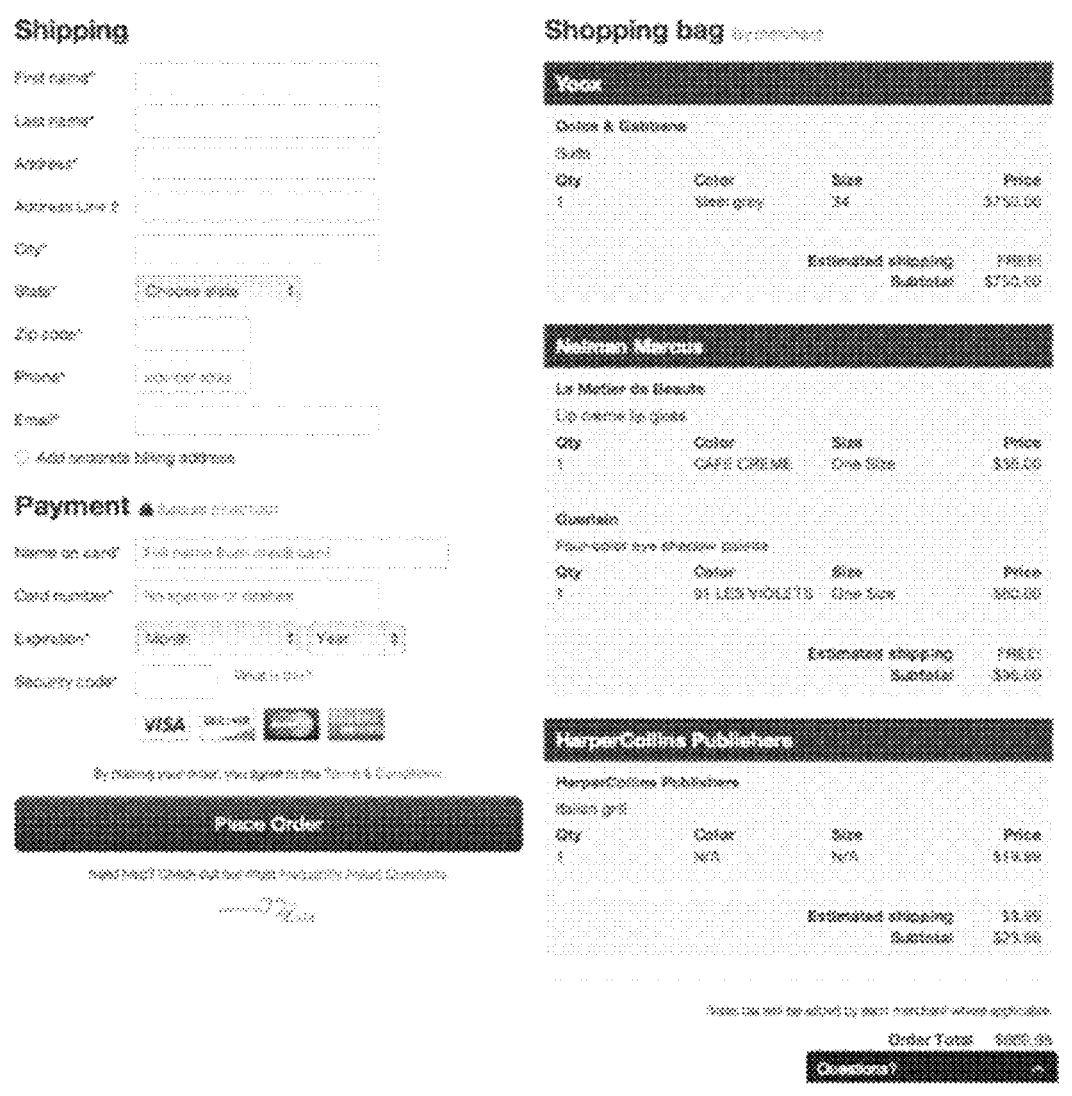

In one embodiment, checkout module 130 retrieves the shopping bag from the e-commerce frame to provide it on the one page checkout frame. The shopping bag on the one page checkout frame may be divided into multiple merchants such that it includes one or more names of the merchants, one or more merchandises selected for purchase by the user from the corresponding merchant including the associated merchandise data. Besides the shopping bag, the one page checkout frame also includes a one page form that the user fills out providing the details such as user's contact information, the shipping address, the billing address and the payment information. As such, all the information needed to process the order is provided on the one page form in the one page checkout frame, thus avoiding the user to enter multiple pages to fill out the information necessary to process the order. Also, the one page checkout frame provides the user the ability to checkout from multiple retailers within a single, universal checkout on the publisher's site. FIG. 4B illustrates an example of the one page checkout frame displayed on a screen of publisher's 104 site in accordance with an embodiment of the present invention. As shown, the one page checkout frame provides a shopping bag divided into four merchandises purchased by three different merchants and a one page form to be filled out by the user in order to process the order.

The e-commerce system 102 may also include an order management module 132 coupled to the e-commerce database 126. Specifically, the order management module 132 receives the order initiated via either the universal checkout frame or the one page checkout frame, stores an encrypted copy of the order in the e-commerce database 126, and then transmits the relevant portions of the order to each participating merchant 106. Specifically, the order management module 132 may retrieve the single order in either the universal checkout frame or the one page checkout frame from the e-commerce database 126 and divide it into separate multiple components based on the corresponding merchants. The number of multiple components of the order may be based on the number of merchants listed on either the universal checkout frame or the one page checkout frame. Therefore, for example if the order in either the universal checkout frame or the one page checkout frame includes three merchandises purchased by three different merchants, the order management module 132 may divide the order into three separate components such that each component of the order is associated with the corresponding merchant.

The e-commerce system 102 may also include an order management module 132 coupled to the e-commerce database 126. Specifically, the order management module 132 receives the order initiated via the universal checkout frame, stores an encrypted copy of the order in the e-commerce database 126, and then transmits the relevant portions of the order to each participating merchant 106 . . . . Specifically, the order management module 132 may retrieve the single order in the universal checkout frame from the e-commerce database 126 and divide it into separate multiple components based on the corresponding merchants. The number of multiple components of the order may be based on the number of merchants listed on the universal checkout frame. Therefore, for example if the order in the universal checkout frame includes three merchandises purchased by three different merchants, the order management module 132 may divide the order into three separate components such that each component of the order is associated with the corresponding merchant.

In one embodiment, the order management module 132 may forward each of the multiple components of the order to the corresponding merchants 106 for processing and shipping the merchandise. As such each of the corresponding merchants, 106 are unaware of the other components of the order associated with other corresponding merchants 106. In another embodiment, the order management module 132 may process the merchandise for the corresponding merchant 106 and forward the component of the order to the corresponding merchandise 106 for shipping the merchandise. The processing of the merchandise may include processing a transaction of the merchandise. In one embodiment, the order management module 132 may include a predefined workflow for each merchant 106. That workflow tries to guarantee that the order is delivered to the merchant 106 within a specific amount of time. If the order may not be delivered in the specific amount of time (due to an error on the merchant's e-commerce system, connectivity problems, etc.), it escalates the order to a customer care person who will then transmit the order to the merchant 106 through some other means.

Figure 5:
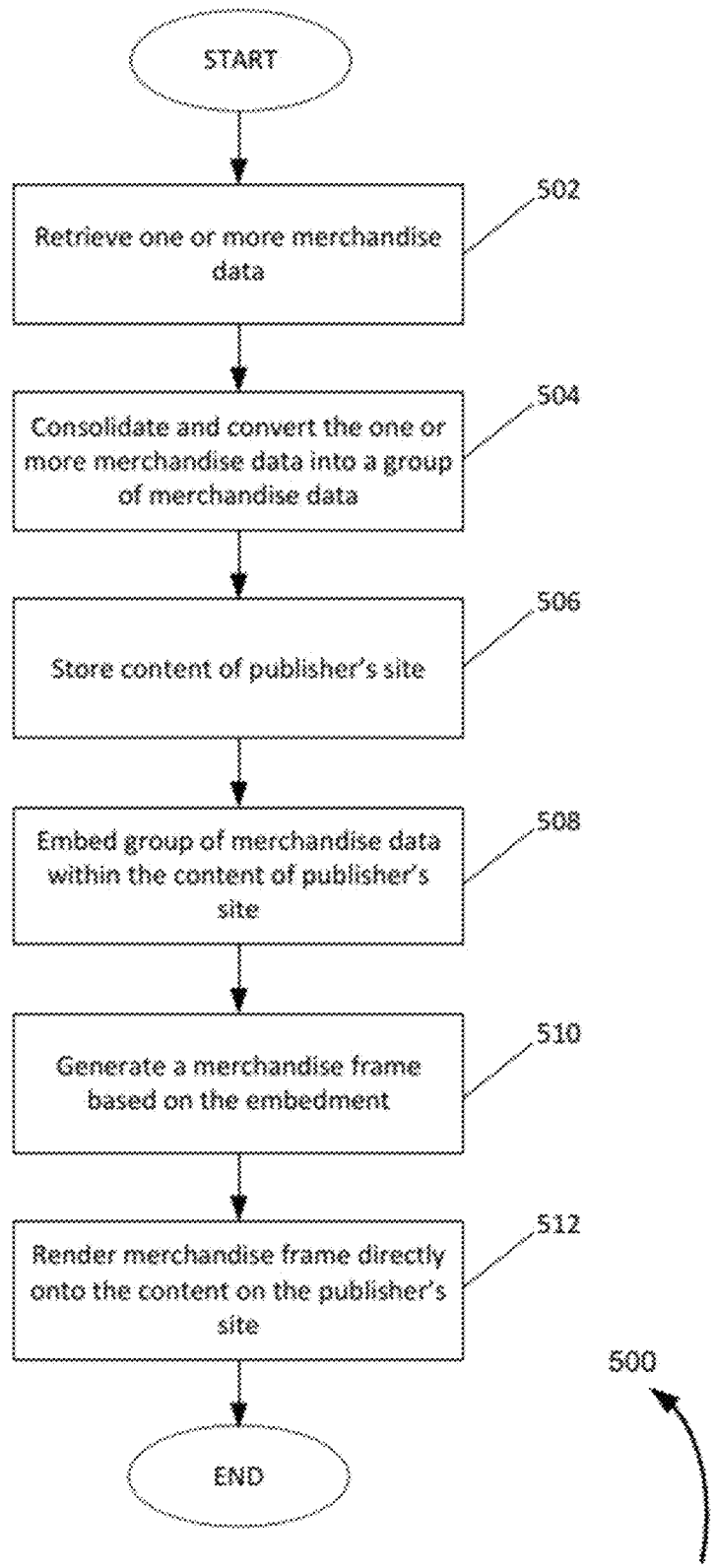
FIG. 5 is a flow diagram illustrating a method for generating merchandise frames in order to provide the e-commerce data in accordance with an embodiment of the present invention.

FIG. 5 is a flow diagram illustrating a method 500 for generating merchandise frames in order to provide the e-commerce data in accordance with an embodiment of the present invention. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by the e-commerce system 102 of FIGS. 1A and 1B executing in a computing device, such as the system 100 of FIG. 1A.

Method 500 begins at block 502 where one more merchandise data is retrieved from a plurality of merchants. As discussed above, the merchandise data may include, but not limited to, the merchandise for sale, name of the merchant selling the merchandise, image, description, value, color, size, shape and form of the merchandise. At block 504, the one or more merchandise data are consolidated and converted into normalized merchandise data with a single common language, style and format. In one embodiment, the publisher curates the one or more merchandise data into a group or set of merchandise data to be presented into the publisher's site and maps the stored content with the group of merchandise data. At block 506, the group of merchandise data is stored. At block 508, the group of merchandise data is embedded within the content of publisher's site. Specifically, a specific group of merchandise data is retrieved based on the mapping with the stored publisher's content and embedded within that content of the publisher's site. At block 510, a merchandise frame is generated based on the embedment. As discussed above, a merchandise frame is a case or border enclosing the group of merchandise data. At block 512, the merchandise frame is rendered directly onto the content on the publisher's 104 site. In one embodiment, the merchandise frames are displayed onto the content on the publisher's site.

Figure 6:
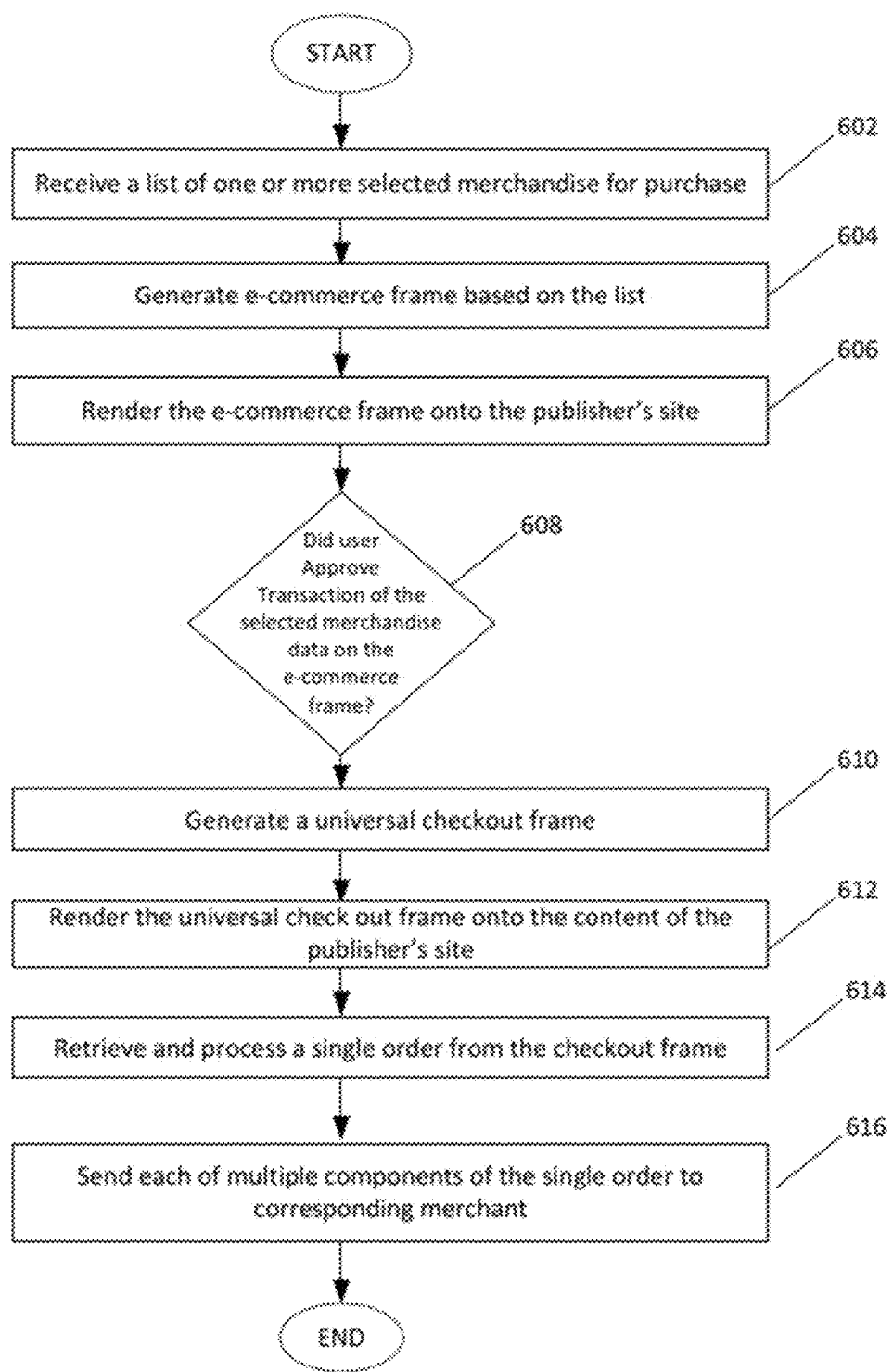
FIG. 6 is a flow diagram illustrating a method for generating and processing e-commerce frames and universal checkout frames to provide the e-commerce data in accordance with an embodiment of the present invention.

FIG. 6 is a flow diagram illustrating a method for generating and processing e-commerce frames and universal checkout frames to provide the e-commerce data in accordance with an embodiment of the present invention. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 is performed by the e-commerce system 102 of FIGS. 1A and 1B executing in a computing device, such as the system 100 of FIG. 1A.

Method 600 begins at block 602 where a list of one of more merchandises selected by the user for purchase is received. At block 604, an e-commerce frame is generated based on the list. As discussed above, an e-commerce frame is a case or a border enclosing a shopping cart or bag listing one or more merchandises selected by the user for purchase and the merchandise data associated with the selected one or more merchandises. As discussed above, an e-commerce frame is a case or border enclosing one of a link to the shopping bag or the shopping bag itself. In one embodiment, e-commerce frame provides the list of selected one or more merchandise data including the name of the merchant shipping each of the selected one or more merchandises data. At block 606, the e-commerce frame is rendered onto the publisher's site. In one embodiment, the e-commerce frame is displayed onto the publisher's site. As such, the merchants corresponding to the one or more selected merchandise data along with the selected merchandise data made visible to the user.

At block 608, it is determined whether the user initiated transaction of the selected merchandise data on the e-commerce frame. If at block 608, the user did not initiate the transaction, the process ends. If at block 608, the user initiated the transaction, then at block 610, the transactions are processed to generate a universal checkout frame. At block 612, the universal checkout frame is rendered onto the content of the publisher's 104 site. In one embodiment, the e-commerce frame is displayed onto the publisher's site. As discussed above, the universal check out frame may include multi-merchandise data including a single order of user's personal data such as user's contact information, user's billing information, user's payment information and an order summary of the one or more merchandises selected for purchase by the user including the name of the merchant processing and shipping the merchandise.

At block 614, the single order from the universal checkout frame is retrieved and processed. In one embodiment, the single order is divided into separate multiple components based on the corresponding merchants. The number of multiple components may be based on the number of merchants listed on the universal checkout frame. At block 616, each of the multiple components of the order is sent to the corresponding merchants. As such, each of the corresponding merchants is unaware of the other components of the order associated with other corresponding merchants. In one embodiment, each of the corresponding merchant may process the merchandise for processing and shipping. In another embodiment, the e-commerce system 102 may process the merchandise for the corresponding merchant and forward the component of the order to the corresponding merchandise for shipping the merchandise. The processing of the merchandise may include processing a transaction of the merchandise.

Figure 7:
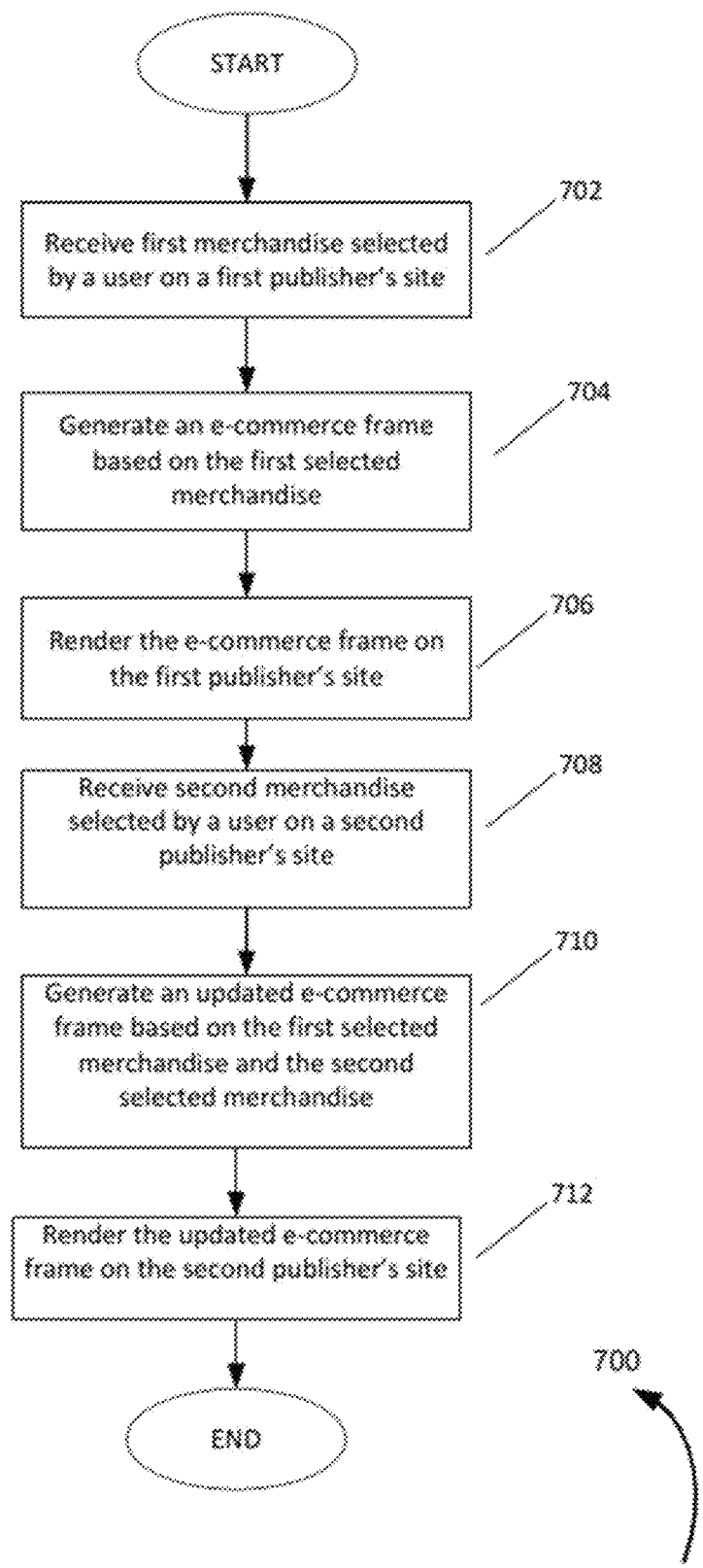
FIG. 7 is a flow diagram illustrating a method for generating e-commerce frames to provide the e-commerce data in accordance with the embodiment of the present invention.

FIG. 7 is a flow diagram illustrating a method for generating e-commerce frames to provide the e-commerce data in accordance with another embodiment of the present invention. Method 700 may be performed by processing logic that may comprise hardware (e.g., circuitry, dedicated logic, programmable logic, microcode, etc.), software (such as instructions run on a processing device), firmware, or a combination thereof. In one embodiment, method 700 is performed by the e-commerce system 102 of FIGS. 1A and 1B executing in a computing device, such as the system 100 of FIG. 1A.

Method 700 begins at block 702 where a first merchandise selected by a user in a first publisher's site is received. At block 704, an e-commerce frame is generated based on the selected first merchandise. As discussed above, the e-commerce frame is generated is a case or border enclosing one of a link to the shopping bag or the shopping bag itself. The e-commerce frame includes the selected first merchandise and merchandise data associated with the first merchandise. At block 706, the e-commerce frame is rendered onto the first publisher's site. In one embodiment, the e-commerce frame is displayed on the first publisher's site. In one embodiment, the user may navigate to a second publisher's website and select a second merchandise on the second publisher's website. At block 708, the second merchandise selected by the user in the second publisher's site is received. At block 710, an updated e-commerce frame is generated. In one embodiment, the updated e-commerce frame includes the updated shopping bag having the first and the second selected merchandises and merchandise data associated with the first and the second merchandises. At block 712, the updated e-commerce frame is rendered onto the second publisher's site. In one embodiment, the updated e-commerce frame is displayed on the second publisher's site.

Figure 8:
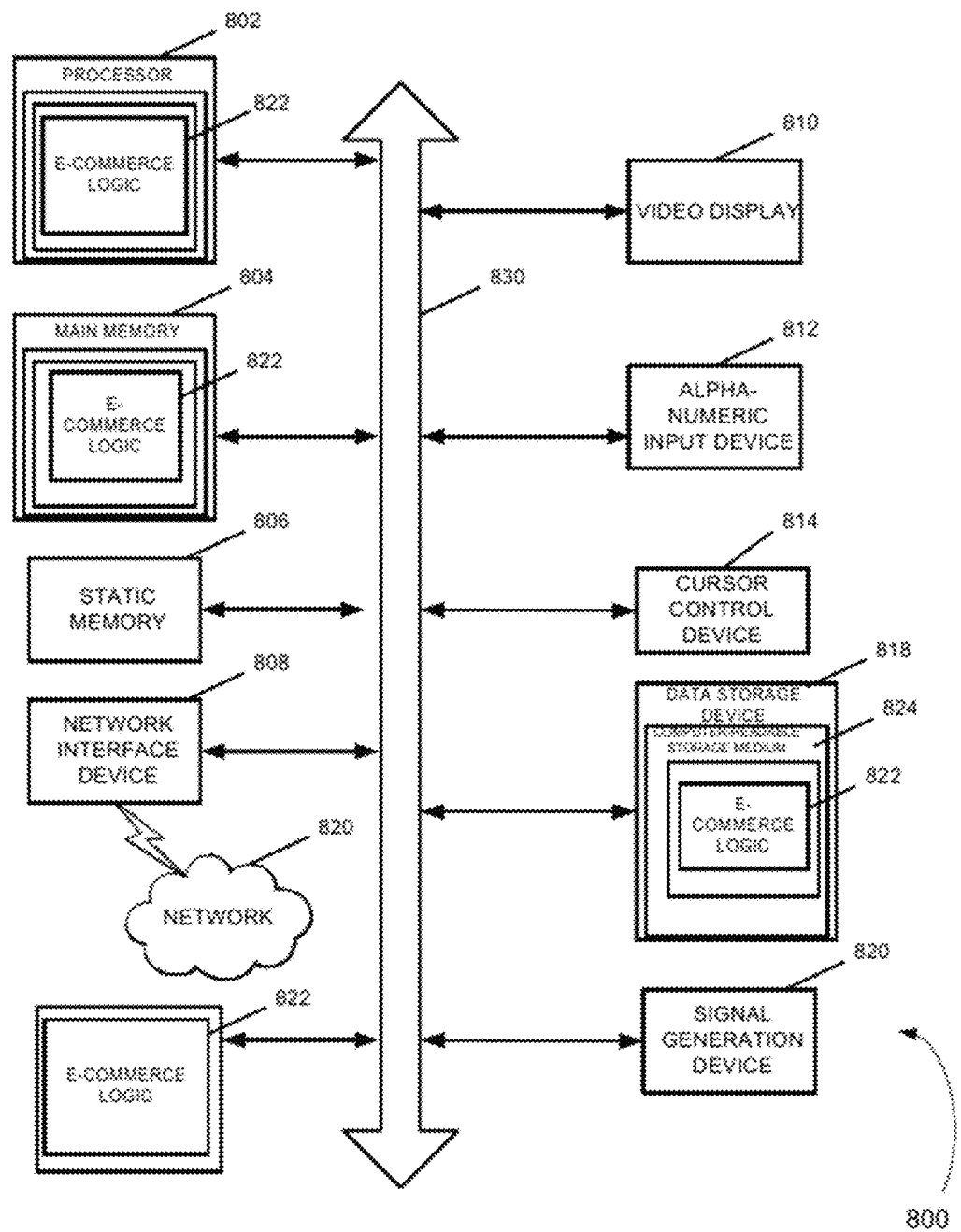
FIG. 8 illustrates a block diagram representation of a machine in the exemplary form of a computer system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processing device 802, a memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute e-commerce logic 822 for performing the operations and steps discussed herein. In one embodiment, e-commerce system 102 described with respect to FIGS. 1 and 2 perform the e-commerce logic 822.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium (or more specifically a computer-readable storage medium) 820 on which is stored one or more sets of instructions (e.g. e-commerce logic 822) embodying any one or more of the methodologies of functions described herein, such as methods 500, 600 and 700 for providing e-commerce data as described with respect to FIGS. 5, 6 and 7 respectively. The e-commerce logic 822 may also reside, completely or at least partially, within the memory 804 and/or within the processing device 802 during execution thereof by the computer system 800; the memory 806 and the processing device 802 constituting machine-accessible storage media.

The machine-readable storage medium 820 may also be used to store the e-commerce logic 822 persistently containing methods that call the above applications. While the machine-accessible storage medium 820 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   retrieving, by a processing device, merchandise data from a plurality of independent merchants which is stored in a merchandise database;
   consolidating the retrieved merchandise data into a common format;
   making the merchandise database available to multiple publishers;
   storing, by the processing device, at least one group of merchandise data formed in view of the merchandise data and content on a site of one of the multiple publishers;
   embedding, by the processing device, the group of merchandise data on the content of the site of the one of the multiple publishers;
   generating, by the processing device, one or more merchandise frames in view of the embedment;
   rendering, by the processing device, the one or more merchandise frames directly onto the site of the one of the multiple publishers;
   generating an e-commerce frame comprising merchandise data from the group of merchandise data that is selected by a user of the site of the one of the multiple publishers, wherein the e-commerce frame is a shopping bag of the selected merchandise data;
   generating, by the processing device, a universal checkout frame that includes:
      a single order of multi-merchandise data comprising first merchandise data and second merchandise data that is selected from the one or more merchandise frames, wherein the first merchandise data corresponds to merchandise provided by a first independent merchant from the plurality of independent merchants, wherein the second merchandise data corresponds to merchandise provided by a second independent merchant from the plurality of independent merchants, and
      an order summary of the multi-merchandise data comprising a name of the first independent merchant and a name of the second independent merchant; and
   rendering the universal checkout frame directly onto the site of the one of the multiple publishers.

2. The method of claim 1 wherein the site of the one of the multiple publishers comprises one of a website or an application.

3. The method of claim 1 wherein the one or more merchandise frames comprise the group of merchandise data comprising at least one of merchandise for sale, name of the merchant selling the merchandise, image, description, value, color, size, shape and form of the merchandise.

4. The method of claim 1 further comprising rendering the e-commerce frame directly onto the site of the one of the multiple publishers, wherein the e-commerce frame comprises one or more selected merchandise data and the name of the merchant shipping the merchandise in the one or more selected merchandise data, wherein the merchant shipping the merchandise is same as the merchant selling the merchandise.

5. The method of claim 1 wherein the order summary further comprises personal data of the user and account data of the user.

6. The method of claim 1 further comprising dividing the single order of the multi-merchandise data into multiple component orders in view of a number of the merchants corresponding to the multi-merchandise data.

7. The method of claim 6 further comprising sending a component order among the multiple component orders to the corresponding merchant.

8. The method of claim 7 further comprising escalating the component order to a customer care person when the component order is not delivered to the corresponding merchant, wherein the customer care person is associated with the corresponding merchant.

9. The method of claim 1 wherein the merchandise database is maintained independent of the multiple publishers.

10. A non-transitory machine-readable storage medium including data that, when accessed by a machine, causes the machine to perform operations comprising:
    retrieving, by a processing device, merchandise data from a plurality of merchants which is stored in a merchandise database;
    making the merchandise database available to multiple publishers;
    storing, by the processing device, at least one group of merchandise data formed in view of the merchandise data and content on a site of one of the multiple publishers;
    embedding, by the processing device, the group of merchandise data on the content of the site of the one of the multiple publishers;
    generating, by the processing device, one or more merchandise frames in view of the embedment;
    rendering, by the processing device, the one or more merchandise frames directly onto the site of the one of the multiple publishers;
    generating an e-commerce frame comprising merchandise data from the group of merchandise data that is selected by a user of the site of the one of the multiple publishers, wherein the e-commerce frame is a shopping bag of the selected merchandise data;

generating, by the processing device, a universal checkout frame that includes:
- a single order comprising multi-merchandise data comprising first merchandise data and second merchandise data that is selected from the one or more merchandise frames, wherein the first merchandise data corresponds to merchandise provided by a first merchant from the plurality of merchants, wherein the second merchandise data corresponds to merchandise provided by a second merchant from the plurality of merchants, and
- an order summary of the first merchandise data and the second merchandise data comprising a name of the first merchant and a name of the second merchant; and rendering the universal checkout frame directly onto the site of the one of the multiple publishers.

11. The non-transitory machine-readable storage medium of claim 10 wherein the site of the one of the multiple publishers comprises one of a website or an application.

12. The non-transitory machine-readable storage medium of claim 10 wherein the one or more merchandise frames comprises the group of merchandise data comprising at least one of merchandise for sale, name of the merchant selling the merchandise, image, description, value, color, size, shape and form of the merchandise.

13. The non-transitory machine-readable storage medium of claim 10 having further data therein, which when accessed by the machine, causes the machine to perform a further set of operations, further comprising:
- rendering the e-commerce frame directly onto the site of the one of the multiple publishers, wherein the e-commerce frame comprises one or more selected merchandise data and the name of the merchant shipping the merchandise in the one or more selected merchandise data, wherein the merchant shipping the merchandise is same as the merchant selling the merchandise.

14. The non-transitory machine-readable storage medium of claim 10 having further data therein, which when accessed by the machine, causes the machine to perform a further set of operations, further comprising:
- generating a universal checkout frame that includes an order summary that further comprises personal data of the user and account data of the user.

15. The non-transitory machine-readable storage medium of claim 10 having further data therein, which when accessed by the machine, causes the machine to perform a further set of operations, further comprising:
- dividing the single order of the multi-merchandise data into multiple component orders in view of a number of the merchants corresponding to the multi-merchandise data.

16. The non-transitory machine-readable storage medium of claim 15 having further data therein, which when accessed by the machine, causes the machine to perform a further set of operations, further comprising:
- sending a component order among the multiple component orders to the corresponding merchant.

17. The non-transitory machine-readable storage medium of claim 16 having further data, therein, which when accessed by the machine, causes the machine to perform a further set of operations, further comprising:
- escalating the component order to a customer care person when the component order is not delivered to the corresponding merchant, wherein the customer care person is associated with the corresponding merchant.

18. The non-transitory machine-readable storage medium of claim 10 wherein the merchandise database is maintained independent of the multiple publishers.

* * * * *